(12) United States Patent
Park et al.

(10) Patent No.: US 11,010,316 B2
(45) Date of Patent: May 18, 2021

(54) MEMORY DEVICE FOR ADJUSTING MEMORY CAPACITY PER CHANNEL AND MEMORY SYSTEM INCLUDING THE SAME

(71) Applicant: SAMSUNG ELECTRONICS CO., LTD., Suwon-si (KR)

(72) Inventors: Jae-Won Park, Hwaseong-si (KR); Je-Min Ryu, Seoul (KR); Sang-Hoon Shin, Yongin-si (KR); Jae-Hoon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 31 days.

(21) Appl. No.: 16/115,089

(22) Filed: Aug. 28, 2018

(65) Prior Publication Data

US 2019/0251043 A1 Aug. 15, 2019

(30) Foreign Application Priority Data

Feb. 13, 2018 (KR) .................. 10-2018-0017953

(51) Int. Cl.
*G06F 13/16* (2006.01)
*G06F 12/06* (2006.01)
*G06F 12/0866* (2016.01)

(52) U.S. Cl.
CPC ...... *G06F 13/1673* (2013.01); *G06F 12/0607* (2013.01); *G06F 12/0866* (2013.01); *G06F 2212/601* (2013.01)

(58) Field of Classification Search
CPC ............. G06F 13/1673; G06F 12/0607; G06F 12/0866; G06F 2212/601

USPC .......................................................... 710/52
See application file for complete search history.

(56) References Cited

U.S. PATENT DOCUMENTS

| | | | |
|---|---|---|---|
| 4,503,501 | A | 3/1985 | Coulson et al. |
| 5,901,332 | A | 5/1999 | Gephardt et al. |
| 7,872,657 | B1 | 1/2011 | Edmondson et al. |
| 8,135,921 | B2 | 3/2012 | Logan et al. |
| 8,359,421 | B2 | 1/2013 | Wang et al. |
| 8,850,154 | B2 | 9/2014 | Kisel |
| 2007/0089030 | A1 | 4/2007 | Beracoechea et al. |
| 2012/0066471 | A1 | 3/2012 | Sadowski et al. |
| 2015/0081989 | A1* | 3/2015 | Lee ............. G06F 12/0607 711/157 |

(Continued)

OTHER PUBLICATIONS

Seokwoo Song, et al., "Energy-Efficient Scheduling for Memory-Intensive GPGPU Workloads", 2014 EDAA.

(Continued)

*Primary Examiner* — Idriss N Alrobaye
(74) *Attorney, Agent, or Firm* — F. Chau & Associates, LLC

(57) ABSTRACT

A memory device includes a first channel including a first cell array and communicating with a memory controller through a first path, a second channel including a second cell array and communicating with the memory controller through a second path, and an assignment control circuit configured to monitor memory usage of the first and second channels and further assign a storage space of a portion of the second cell array to the first channel when the memory usage of the first cell array exceeds a threshold value. Access to the storage space of the portion of the second cell array assigned to the first channel is performed through the first path.

13 Claims, 15 Drawing Sheets

(56) References Cited

U.S. PATENT DOCUMENTS

2017/0091040 A1* 3/2017 Wright .................. H01L 25/105
2018/0095910 A1* 4/2018 Kulick ................ G06F 13/1689
2019/0103154 A1* 4/2019 Cox ..................... G11C 7/1045

OTHER PUBLICATIONS

Niladrish Chatterjee, et al., "Managing DRAM Latency Divergence in Irregular GPGPU Applications", SC14: International Conference for High Performance Computing, Networking, Storage and Analysis, 2014 IEEE, pp. 128-139.
Ping Chi et al., "PRIME: A Novel Processing-in-memory Architecture for Neural Network Computation in ReRAM-based Main Memory", 2016 ACM/IEEE 43rd Annual International Symposium on Computer Architecture, pp. 27-39.
G. Heigold, et al., "Multilingual Acoustic Models Using Distributed Deep Neural Networks", ICAASSP 2013, pp. 8619-8623.
Sebastian Thrun, et al., "Discovering Structure in Multiple Learning Tasks: The TC Algorithm", In: Proceedings of the Thirteenth International Conference on Machine Learning, San Mateo, CA 1996.
Sang-Woo Lee, "Dual Memory Architectures for Fast Deep Learning of Stream Data via an Online-Incremental-Transfer Strategy", ICML workshop on Deep Learning 2015, Lille, France, 2015.

* cited by examiner

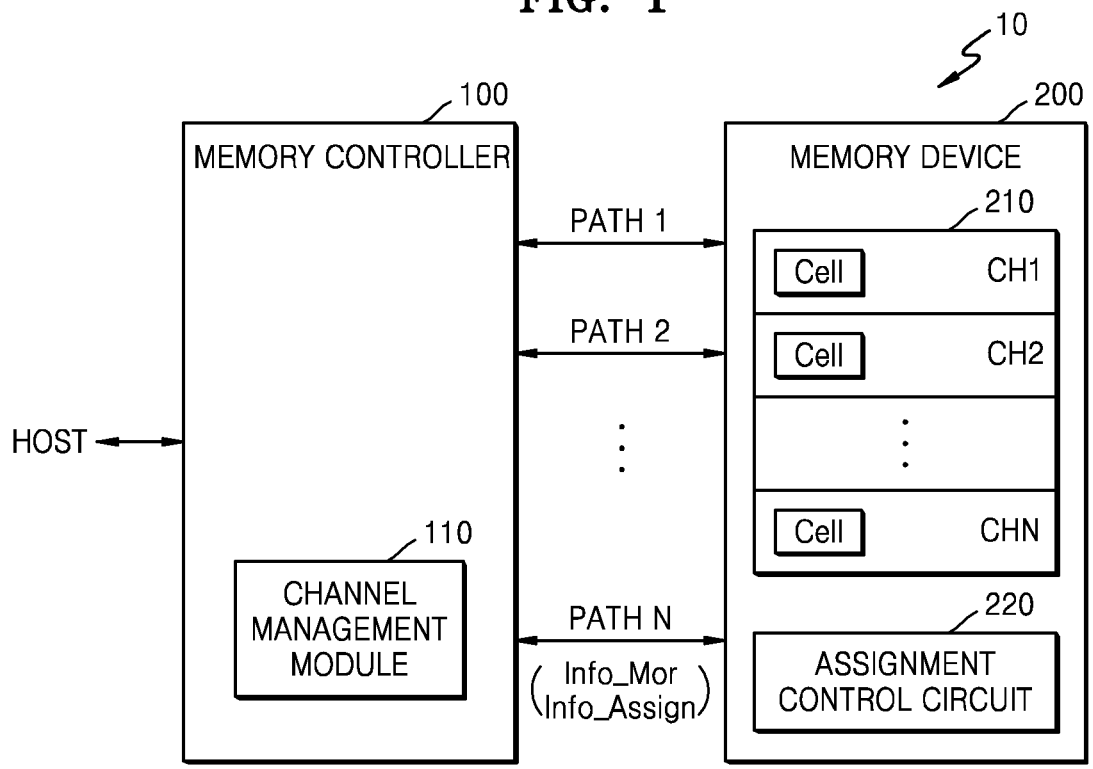
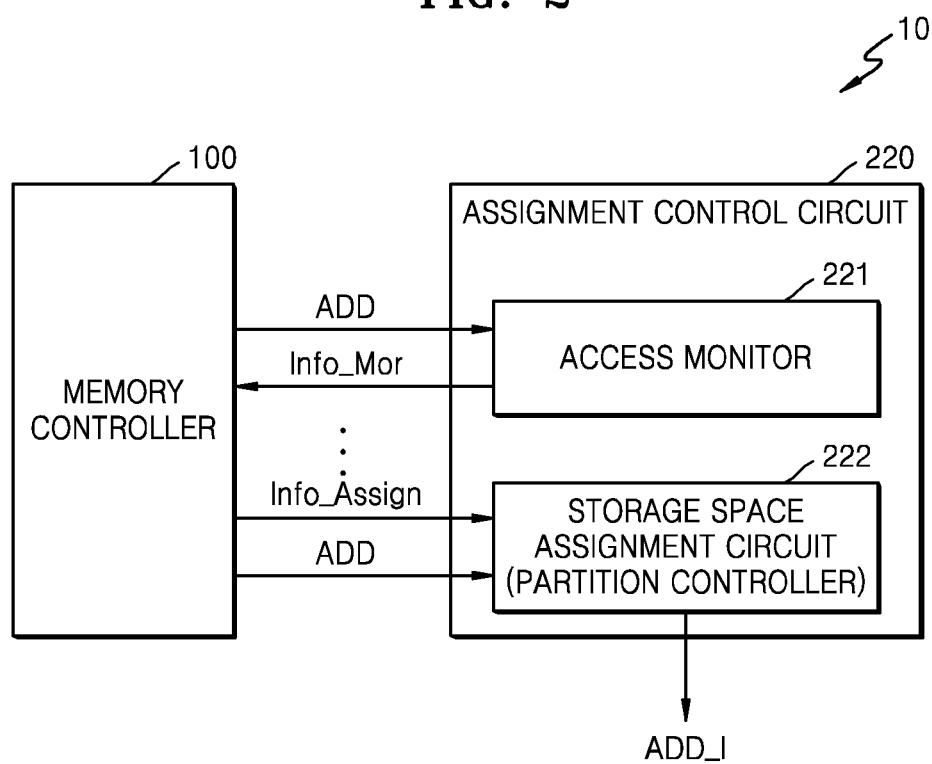

FIG. 7

| | Assigned Channel | Access Ratio (AR) | | | | | | |
|---|---|---|---|---|---|---|---|---|
| | CHA | CHB | CHC | CHD | CHE | CHF | CHG | CHH |
| Initial | 5 | 5 | 5 | 5 | 5 | 5 | 5 | 5 |
| Access:CHA | 6 | 4 | 4 | 4 | 4 | 4 | 4 | 4 |
| Access:CHD | 5 | 3 | 3 | 5 | 3 | 3 | 3 | 3 |
| Access:CHA | 6 | 2 | 2 | 4 | 2 | 2 | 2 | 2 |
| Access:CHA | 7 | 1 | 1 | 3 | 1 | 1 | 1 | 1 |
| Update | 5 | 5 | 5 | 5 | 5 | 5 | 5 | 5 | ical field

MEMORY DEVICE FOR ADJUSTING MEMORY CAPACITY PER CHANNEL AND MEMORY SYSTEM INCLUDING THE SAME

CROSS-REFERENCE TO RELATED APPLICATION

This application claims priority under 35 U.S.C. § 119 to Korean Patent Application No. 10-2018-0017953, filed on Feb. 13, 2018 in the Korean Intellectual Property Office, the disclosure of which is incorporated by reference herein in its entirety.

TECHNICAL FIELD

Exemplary embodiments of the inventive concept relate to a memory device, and more particularly, to a memory device for adjusting a memory capacity per channel and a memory system including the same.

DISCUSSION OF RELATED ART

Semiconductor memory devices, which are widely used in high performance electronic systems, are increasing in capacity and speed. As an example of a semiconductor memory device, dynamic random access memory (DRAM) is a volatile memory that determines data by charges stored in a capacitor.

Memory devices may be used for various purposes, for example, to store vast amounts of data used in different kinds of operation processing. A memory device may include a plurality of channels and storage space may be assigned to each of the channels.

SUMMARY

According to an exemplary embodiment of the inventive concept, a memory device includes a first channel including a first cell array and communicating with a memory controller through a first path, a second channel including a second cell array and communicating with the memory controller through a second path, and an assignment control circuit configured to monitor memory usage of the first and second channels and further assign a storage space of a portion of the second cell array to the first channel when the memory usage of the first cell array exceeds a threshold value. Access to the storage space of the portion of the second cell array assigned to the first channel is performed through the first path.

According to an exemplary embodiment of the inventive concept, a memory system includes a memory controller configured to control memory operations, and a memory device including first to Nth channels (where N is an integer of 2 or more) each for performing data communication with the memory controller through an independent interface, where each of the first to Nth channels includes a cell array. The memory device includes an assignment control circuit configured to provide a result of monitoring memory usage of the first to Nth channels to the memory controller, to assign a storage space to each of the first to Nth channels in response to a control of the memory controller, and to further assign a storage space of at least one other channel to the first channel according to memory usage of the first channel.

According to an exemplary embodiment of the inventive concept, a high bandwidth memory (HBM) device includes one or more core dies including a plurality of channels, where each of the plurality of channels includes a cell array, and a buffer die configured to provide an interface between the plurality of channels and an external controller, and to communicate with the external controller through a plurality of paths corresponding to the plurality of channels. The buffer die includes an access monitor configured to monitor memory usage of a first channel among the plurality of channels based on a counting operation, and a partition controller including an address conversion table configured to convert an address from the external controller into an internal address for accessing the one or more core dies, and configured to manage the address conversion table so that a storage space of at least one other channel is further assigned to the first channel when the memory usage of the first channel exceeds a threshold value.

BRIEF DESCRIPTION OF THE DRAWINGS

The above and other features of the inventive concept will be more clearly understood by describing in detail exemplary embodiments thereof with reference to the accompanying drawings.

FIG. 1 is a block diagram of a memory system according to an exemplary embodiment of the inventive concept.

FIG. 2 a block diagram of an embodiment of an assignment control circuit of FIG. 1 according to an exemplary embodiment of the inventive concept.

FIGS. 5 to 7 are block diagrams of an access monitor and an operation thereof according to an exemplary embodiment of the inventive concept.

DETAILED DESCRIPTION OF THE EMBODIMENTS

Figure 3:
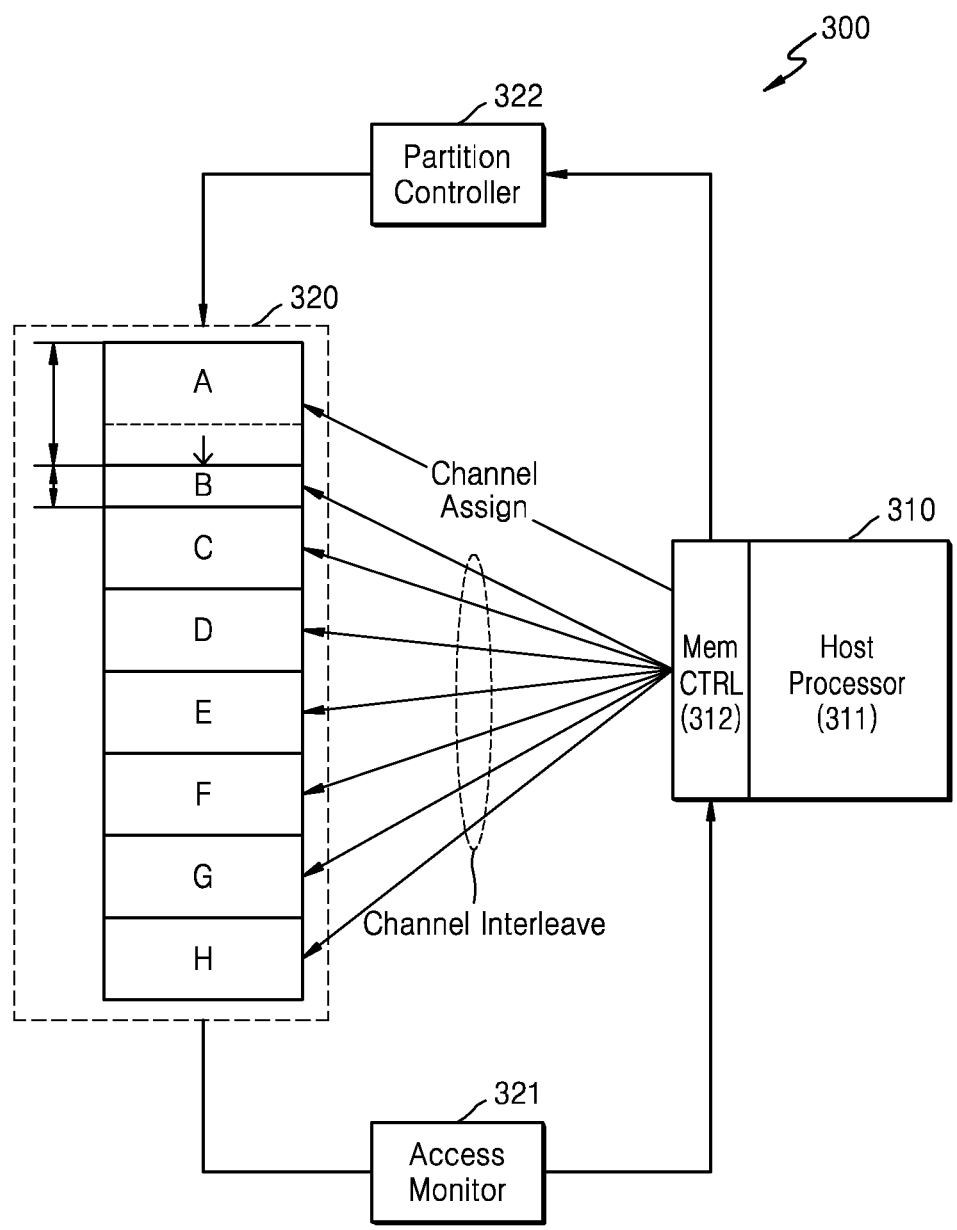
FIG. 3 is a block diagram illustrating an example of assigning a storage space per channel according to an exemplary embodiment of the inventive concept.

Exemplary embodiments of the inventive concept provide a memory device capable of efficiently using a memory space by adjusting a memory capacity of a plurality of channels, and a memory system including the memory device.

Hereinafter, exemplary embodiments of the inventive concept will be described in detail with reference to the accompanying drawings. Like reference numerals may refer to like elements throughout this application.

FIG. 1 is a block diagram of a memory system according to an exemplary embodiment of the inventive concept.

Referring to FIG. 1, a memory system 10 may include a memory controller 100 and a memory device 200. The memory device 200 may include a plurality of channels 210 (e.g., N channels CH1 to CHN), and each of the plurality of channels CH1 to CHN may include a cell array Cell having a storage space. Additionally, communication may be performed between the memory controller 100 and the memory device 200 through an independent interface with respect to the plurality of channels CH1 to CHN. In other words, as each channel includes a separate interface from one another, each channel may perform substantially the same operation as an individual memory device. The memory controller 100 may provide various signals to the memory device 200 to control memory operations such as writing and reading. For example, the memory controller 100 may access data of the cell array Cell of the channels CH1 to CHN by providing a command and an address to the memory device 200.

The memory system 10 may be a data processing system or a configuration included therein. The data processing system may be various types of systems such as a personal computer (PC), a data server, a cloud system, an artificial intelligence server, a network-attached storage (NAS), or an Internet of Things (IoT) device. Alternatively, the data processing system may be various types of portable electronic devices such as a laptop computer, a mobile phone, a smart phone, a tablet PC, a personal digital assistant (PDA), a digital video camera, an audio device, a portable multimedia player (PMP), an MP3 player, a handheld game console, an e-book, a wearable device, or the like.

The memory controller 100 may access the memory device 200 in response to a request from a host HOST. The memory controller 100 may communicate with the host HOST using various protocols. For example, the memory controller 100 may communicate with the host HOST using an interface protocol such as peripheral component interconnect-express (PCI-E), advanced technology attachment (ATA), parallel ATA (PATA), or serial attached small computer system interface (SCSI) (SAS).

The memory device 200 may further include an assignment control circuit 220 that assigns storage spaces for the plurality of channels CH1 to CHN and may adjust a memory capacity of each of the plurality of channels CH1 to CHN. For example, storage spaces for cell arrays Cell of the plurality of channels CH1 to CHN may have an identical size or similar sizes. For example, the assignment control circuit 220 may adjust a memory capacity of each of the channels by setting an address range of the storage spaces assigned to the plurality of channels CH1 to CHN.

Meanwhile, the memory device 200 may be dynamic random access memory (DRAM) such as a double data rate synchronous DRAM (DDR SDRAM), low power double data rate (LPDDR) SDRAM, graphics double data rate (GDDR) SDRAM, or rambus DRAM (RDRAM). However, the inventive concept is not limited thereto. For example, the memory device 200 may be implemented as a nonvolatile memory such as a flash memory, magnetic RAM (MRAM), ferroelectric RAM (FeRAM), phase change RAM (PRAM), or resistive RAM (ReRAM).

The memory controller 100 and the memory device 200 perform data communication through independent interfaces per channel so that N paths (or communication paths) PATH 1 to PATH N may be formed between the memory controller 100 and the memory device 200. In addition, the memory controller 100 may assign any one of the plurality of channels CH1 to CHN in response to a request of the host HOST, and may store data in the assigned channel. For example, when an application is executed in the host HOST and a data access request is provided, one of the plurality of channels CH1 to CHN is assigned, and data may be read or stored from/in the assigned channel during the application execution. Furthermore, data may be accessed through channel interleaving in the remaining channels for other operations.

If a large amount of data is stored by executing an application, a storage space of the assigned channel (e.g., a first channel) may be insufficient. Here, a part of data stored in the first channel may be deleted. Alternatively, if two or more channels are assigned to secure a storage space for executing the application, a bandwidth of the remaining channels may be reduced, which may lead to degradation of performance of the memory system 10.

According to an exemplary embodiment of the inventive concept, the memory device 200 dynamically adjusts a memory capacity of a channel according to memory usage of the channel, thus increasing a memory capacity of the currently assigned channel while preventing a bandwidth of the other channels from decreasing. For example, the assignment control circuit 220 monitors memory usage of the plurality of channels CH1 to CHN and adjusts a memory capacity for each channel based on a result of the monitoring. If memory usage of the first channel CH1 is greater according to the monitoring result, a storage space of the other one or more channels having relatively less memory usage may be further assigned to the first channel CH1. Such an operation may be described as adjusting a partition of the plurality of channels CH1 to CHN for the entire storage space included in the memory device 200.

For example, further assigning a storage space of a portion of the second channel CH2 to the first channel CH1 may mean that a storage space of a portion of the cell array Cell included in the second channel CH2 is recognized as a storage space included in the first channel CH1 by the memory controller 100. Furthermore, data of the storage space of a portion of the cell array Cell included in the second channel CH2 may be accessed by the memory controller 100 through the communication path PATH1 corresponding to the first channel CH1.

The assignment control circuit 220 may monitor memory usage by determining an access state of the plurality of channels CH1 to CHN and provide monitoring information Info_Mor to the memory controller 100 accordingly. The memory controller 100 may include a channel management module 110 for managing the channels CH1 to CHN of the memory device 200, and the channel management module 110 may determine whether to adjust a memory capacity for each channel based on the monitoring information Info_Mor. The channel management module 110 may generate assignment information Info_Assign for further assigning a storage space to a channel having a relatively large amount of memory usage according to a result of the determination, and provide the assignment information Info_Assign to the assignment control circuit 220. For example, the channel management module 110 may determine a location of another channel which further assigns a storage space to the first channel CH1, and may also determine a size of the storage space to be further assigned.

The assignment control circuit 220 may adjust a memory capacity of the channels CH1 to CHN by controlling assignment of the storage space in response to the assignment information Info_Assign, and the memory device 200 may access data for each channel according to the adjusted memory capacity. If the storage space (e.g., a first storage space) of a portion of the cell array Cell in the second channel CH2 is further assigned to the first channel CH1, the memory controller 100 may recognize the first storage space of the second channel CH2 as the first channel CH1 and request access through the communication path PATH1 corresponding to the first channel CH1. In response to this, the memory device 200 may access data in the first storage space of the second channel CH2 by an internal control operation, and may provide a response to the memory controller 100 through the communication path PATH1 corresponding to the first channel CH1.

According to an exemplary embodiment of the inventive concept as described above, since the size of a storage space of a channel may be dynamically adjusted according to a memory usage amount per channel, the large amount of data may be stably stored without reducing a bandwidth of other channels.

FIG. 2 a block diagram of an assignment control circuit of FIG. 1 according to an exemplary embodiment of the inventive concept.

Referring to FIGS. 1 and 2, the assignment control circuit 220 may include an access monitor 221 and a storage space assignment circuit 222. As described above, the storage space assignment circuit 222 may be referred to as a partition controller in that the storage space assignment circuit 222 adjusts the partition of the plurality of channels CH1 to CHN for the entire storage space. In the description below, "the storage space assignment circuit" and "the partition controller" may be used interchangeably.

The access monitor 221 may monitor memory usage of each of the plurality of channels CH1 to CHN of the memory device 200. For example, the access monitor 221 may determine an address ADD provided from the memory controller 100 and determine the memory usage of each of the plurality of channels CH1 to CHN based thereon. For example, the access monitor 221 may provide the memory controller 100 with the monitoring information Info_Mor indicating a channel having a relatively large memory usage from among the plurality of channels CH1 to CHN.

The memory controller 100 may determine memory usage of a channel through the monitoring information Info_Mor and generate the assignment information Info_Assign including information for assigning a storage space to the channel to provide the assignment information Info_Assign to the storage space assignment circuit 222. For example, when a storage space of a portion of the second channel CH2 is further assigned to the first channel CH1, the memory controller 100 may provide address information (e.g., ADD) indicating the storage space of a portion of the second channel CH2 to the storage space assignment circuit 222.

The storage space assignment circuit 222 may assign a storage space for each channel by setting address information therein. For example, the storage space assignment circuit 222 may convert the address ADD provided from the memory controller 100 based on information stored therein into an internal address ADD_I. The memory controller 100 may recognize the storage space of a portion of the second channel CH2 as a storage space of the first channel CH1. When a data access request is provided from the memory controller 100 through the first communication path PATH1 corresponding to the first channel CH1, the storage space assignment circuit 222 may generate the internal address ADD_I indicating the storage space of a portion of the second channel CH2 in response to the data access request and provide a result of the access to the memory controller 100 through the first communication path PATH1.

Meanwhile, the various components shown in FIGS. 1 and 2 may be implemented in different ways. For example, each of the channel management module 110, the access monitor 221, and the storage space assignment circuit 222 may be implemented as a hardware device, or in the form of software including codes in which functions are implemented as the codes are executed by a processor. Alternatively, each of the channel management module 110, the access monitor 221, and the storage space assignment circuit 222 may be implemented by a combination of hardware and software.

Furthermore, although the exemplary embodiments of FIGS. 1 and 2 illustrate an example in which the assignment control circuit 220 is implemented in the memory device 200, the inventive concept is not limited thereto. For example, functions of at least a portion of the assignment control circuit 220 may be provided in the memory controller 100. As an example, the memory system 10 may be implemented in a form in which at least one of the access monitor 221 and the storage space assignment circuit 222 is provided in the memory controller 100. Alternatively, the memory system 10 may be implemented in a form in which the memory device 200 determines whether to assign an additional storage space to a specific channel according to a result of monitoring memory usage of a channel, and provides information related to a memory capacity of each channel to the memory controller 100.

FIG. 3 is a block diagram illustrating an example of assigning a storage space per channel according to an exemplary embodiment of the inventive concept.

Referring to FIG. 3, a memory system 300 may include a host 310 and a memory device 320 including a plurality of channels. FIG. 3 shows an example in which the memory device 320 includes eight channels A to H (e.g., CHA to CHH). In addition, an access monitor 321 and a partition controller (or a storage space assignment circuit 322) may be included in the memory device 320.

The host 310 may include a host processor 311 and a memory controller 312. The memory controller 312 may correspond to the memory controller shown in the above-described exemplary embodiment. Accordingly, the memory controller 312 may include a channel management module.

According to an exemplary embodiment of the inventive concept, the memory system 300 shown in FIG. 3 may correspond to a data processing system such as a mobile device. For example, the host 310 may include an application processor, and the application processor may be implemented as a system-on-chip (SoC). In addition, the application processor may include a system bus to which a protocol having a predetermined standard bus specification is applied, and may also include a plurality of intellectual property (IP) blocks connected to the system bus. Further, when the application processor includes a modem processor that performs a modem communication function, the application processor may be referred to as a ModAP.

Referring to FIG. 3, it is assumed that the channel A CHA from among the eight channels CHA to CHH of the memory device 320 is assigned and used. While the channel A CHA is assigned and used, the other channels CHB to CHH may be interleaved and used. As an example of use, data may be stored in the assigned channel A CHA when a specific application is executed, and the other channels CHB to CHH may be interleaved and used to store an intermediate result in an operation process of the specific application or data according to execution of another kind of application.

If a storage space of the assigned channel A CHA is insufficient and another channel is further assigned, a bandwidth of the remaining channels may be reduced, resulting in performance degradation. According to an exemplary embodiment of the inventive concept, a memory capacity may be increased by further assigning a storage space to the currently assigned channel while maintaining a bandwidth of the remaining channels without needing to further assign another channel for the execution of the application. For example, as in the above-described example, a storage space of the channel B CHB may be further assigned to the channel A CHA based on operations of the access monitor 321 and the partition controller 322.

As an example of operation, the access monitor 321 may monitor memory usage of the channels CHA to CHH. According to an exemplary embodiment of the inventive concept, the access monitor 321 may monitor the memory usage of the channels CHA to CHH by monitoring access times of the channels CHA to CHH. Additionally, the access monitor 321 may further confirm the range of a storage space currently used in each channel. In other words, even if the number of accesses to the data is large, data may be stored in duplicate in the existing storage space. Therefore, it may be determined whether or not to further assign a storage space into the channel A CHA by determining access frequency and the range of a used storage space.

A result of the monitoring by the access monitor 321 is provided to the memory controller 312, and the memory controller 312 may determine whether to assign more storage space to the channel A CHA based on the monitoring result. In addition, the memory controller 312 may generate the assignment information Info_Assign for adjusting the memory capacity of the channels CHA to CHH and provide the assignment information Info_Assign to the memory device 320. The assignment information Info_Assign may include an address range indicating a storage space for each channel. The partition controller 322 may receive the assignment information Info_Assign and assign a storage space to each channel through address management.

Figure 4:
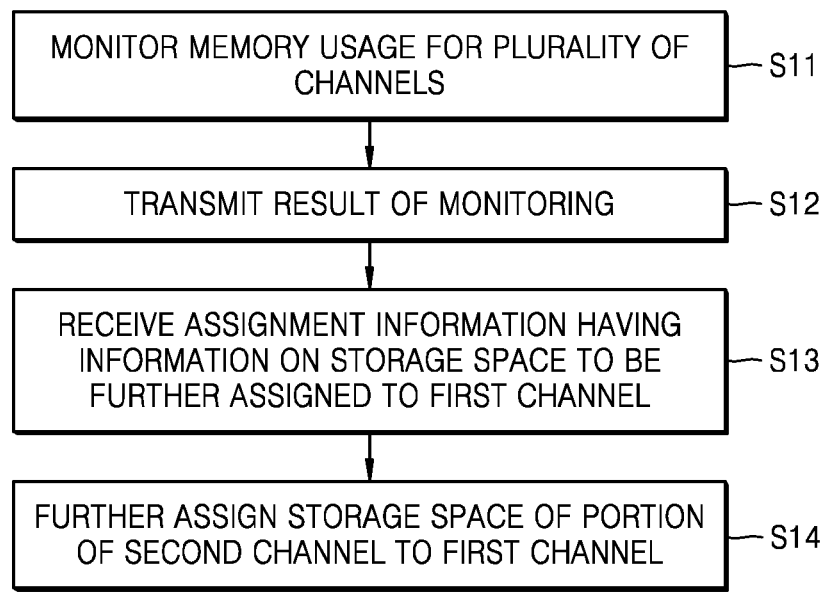
FIG. 4 is a flowchart of a method of operating a memory device, according to an exemplary embodiment of the inventive concept.

FIG. 4 is a flowchart of a method of operating a memory device, according to an exemplary embodiment of the inventive concept.

Referring to FIG. 4, the memory device includes a plurality of channels, and the plurality of channels may communicate data through an independent interface (or a path) with a memory controller. As an example, the plurality of channels may include cell arrays having the same or similar size, and memory usage may be different for each channel depending on an application being executed.

In operation S11, the memory device may monitor the memory usage for the plurality of channels. For example, the memory device may monitor the memory usage by determining an access state of the plurality of channels, determine absolute memory usage of each channel, or determine relative memory usage among the plurality of channels. For example, the memory device may determine a channel having relatively large memory usage and a channel having relatively low memory usage.

In operation S12, a result of the monitoring may be transmitted to the memory controller. The memory controller may determine whether to assign a storage space to a first channel based on the monitoring result. For example, when memory usage of the first channel exceeds a predetermined threshold value, it can be determined that it is necessary to increase a memory capacity of the first channel. For example, the memory controller may determine a channel (e.g., a second channel) having a storage space to be further assigned to the first channel, and may also determine a size of the storage space to be further assigned to the first channel.

In operation S13, the memory device may receive assignment information having information on the storage space to be further assigned to the first channel from the memory controller. For example, the memory controller may provide the memory device with address information indicating a location of a storage space of a portion of the second channel along with information about the second channel for further assigning a storage space to the first channel. As another example, the memory controller may provide information related to the size of a storage space to be further assigned along with the information about the second channel, and the memory device may select a storage space at any location of the second channel according to the size information of the storage space.

In operation S14, the memory device may further assign the storage space of a portion of the second channel to the first channel by managing an address according to the received assignment information. For example, the assignment of the storage space may be performed by managing an address conversion table having conversion information between an external address and an internal address. Thereafter, when access to the storage space of a portion of the second channel assigned to the first channel is requested, the memory device may access data in the storage space of a portion of the second channel and provide the data to the memory controller through a path corresponding to the first channel.

Figure 5:
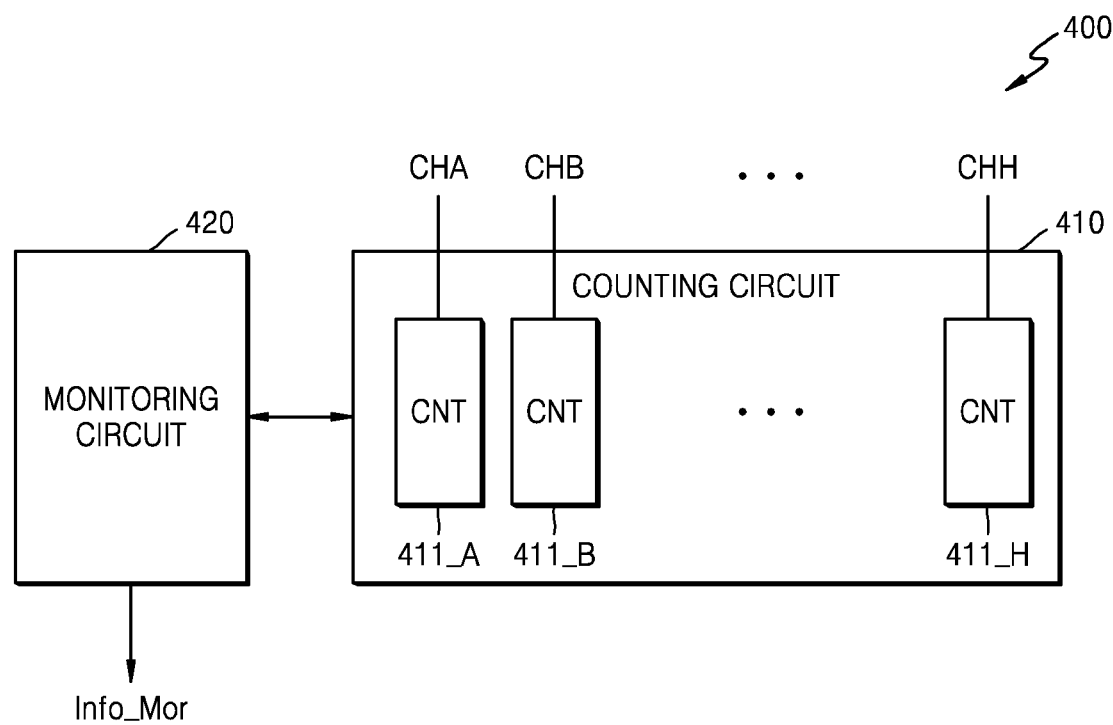
Figure 6:
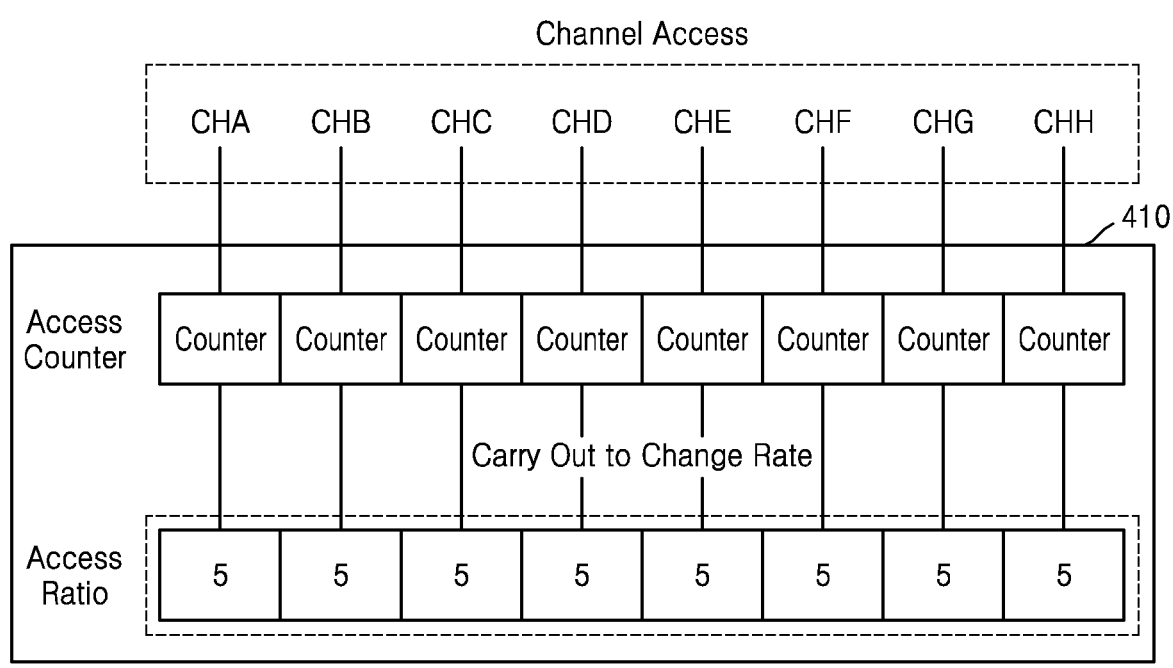

FIGS. 5 to 7 are block diagrams of an access monitor and an operation thereof according to an exemplary embodiment of the inventive concept.

Referring to FIG. 5, an access monitor 400 may include a counting circuit 410 and a monitoring circuit 420. The counting circuit 410 may include a plurality of counters 411_A to 411_H corresponding to the plurality of channels CHA to CHH. In addition, each of the plurality of counters 411_A to 411_H may include one or more counters. Furthermore, the monitoring circuit 420 may perform a monitoring operation based on information of the counters 411_A to 411_H, and may also perform a control operation on the counters 411_A to 411_H. In addition, the monitoring circuit 420 may generate the monitoring information Info_Mor described above based on the information of the counters 411_A to 411_H.

An example of an operation of the access monitor 400 shown in FIG. 5 will be described with reference to FIGS. 6 and 7.

In an exemplary embodiment of the inventive concept, the counting circuit 410 may include two counter layers. For example, the counting circuit 410 may include a first counter block for counting the number of accesses for each of the channels CHA to CHH, and the first counter block may include a counter (e.g., a first counter) corresponding to each channel. Further, the counting circuit 410 may include a second counter block for counting access rates of the channels CHA to CHH, and the second counter block may include a counter (e.g., a second counter) corresponding to each channel. The first counter may perform a counting operation every time an access is performed on each channel, and the second counter may perform a counting operation every time the first counter counts a predetermined number of times.

According to an exemplary embodiment of the inventive concept, when the second counter of any one channel increases a counting value, the second counter of the remaining channels may decrease the counting value thereof. For example, when the second counter of the channel A CHA increases its counting value by one, the second counters of the remaining channels may each decrease their counting values by one. According to an exemplary embodiment of the inventive concept, the second counter of the remaining channels may decrease the counting value in response to information indicating that the counting value of the second counter of the channel A CHA increases, or may decrease the counting value by control of the monitoring circuit 420.

According to an exemplary embodiment of the inventive concept, registers may be arranged for the channels CHA to CHH instead of the second counter and a value stored in a register corresponding to each of the channels may be increased or decreased according to a result of the counting of the first counter. For example, the value of the register may be increased or decreased by control of the monitoring circuit 420. The monitoring circuit 420 may generate the monitoring information Info_Mor described above based on information stored in the second counter or the register. Here, the second counter or the register may be referred to as an access rate storage circuit.

FIG. 7 shows an example of a change in a value of the second counter of the plurality of channels CHA to CHH. For example, the value of the second counter of the plurality of channels is set to an initial value of 5, and when a value of a second counter of any one channel increases by one as the number of accesses of that channel increases, a value of the second counter of the remaining channels may decrease by one.

First, as a value of the first counter corresponding to the channel A CHA increases, a value of the second counter corresponding to the channel A CHA increases by one. Meanwhile, a value of the second counter corresponding to the remaining channels may decrease by one. Thereafter, as a value of the first counter corresponding to the channel D CHD increases, a value of the second counter corresponding to the channel D CHD increases by one. Meanwhile, a value of the second counter corresponding to the remaining channels may decrease by one. As an access operation as shown in FIG. 7 occurs, the value of the second counter corresponding to the channel A CHA at a specific point in time is 7, while the value of the second counter corresponding to the remaining channels has a relatively lower value (e.g., 1 or 3).

The memory controller determines whether there is a need to further assign a storage space to some channels according to the monitoring result described above. For example, the memory controller may be set to further assign a storage space to a corresponding channel when the value of the second counter is greater than or equal to a predetermined reference value (e.g., 7 in FIG. 7), the memory controller may provide a memory device with assignment information for assigning a portion of a storage space of at least one other channel to the channel A CHA.

For example, the memory controller may arbitrarily select one or more channels having a relatively small number of accesses from among the remaining channels. Alternatively, the memory controller may select a specific channel according to a channel structure of the memory device, and may assign a partial space of the selected channel to the channel A CHA. Furthermore, the memory controller may assign a storage space of a predetermined size in the selected channel to the channel A CHA. Alternatively, the memory controller may implement a memory system to adjust the size of the storage space assigned to the channel A CHA based on memory usage of the selected channel.

After the storage space is further assigned to the channel A according to the above process, the value of the second counter of the channels CHA to CHH may be updated to an initial value.

Figure 8:
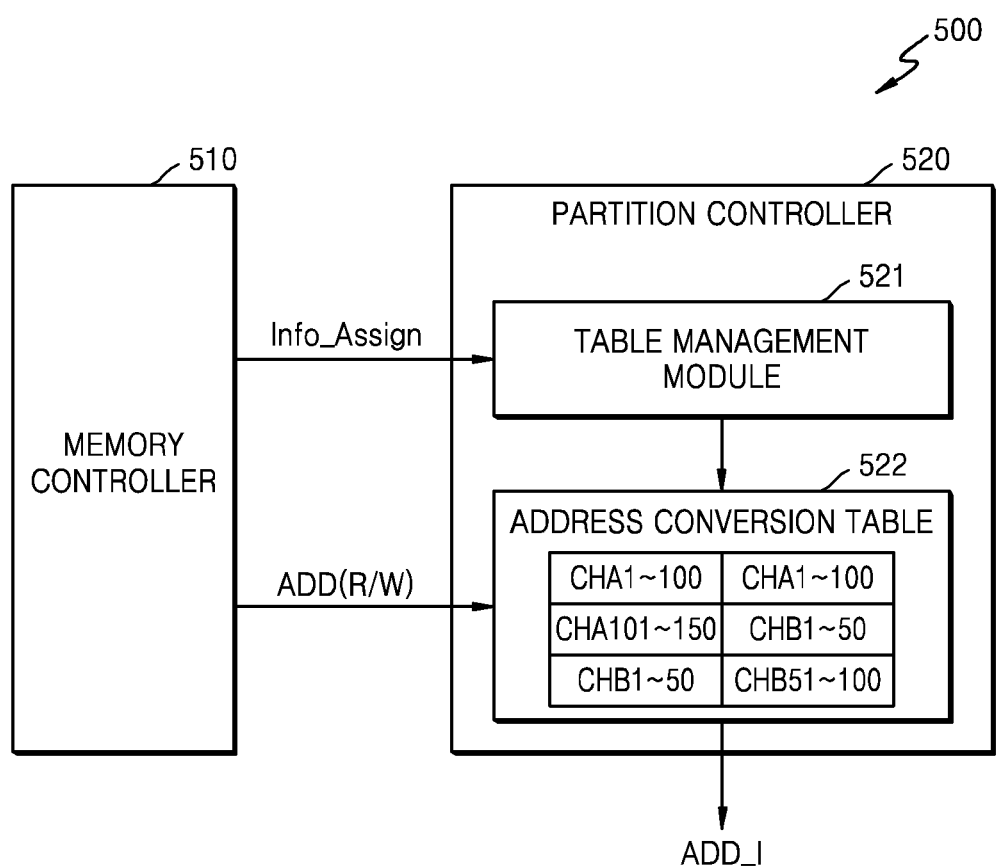
FIGS. 8 and 9 are block diagrams of a partition controller and an operation thereof according to an exemplary embodiment of the inventive concept.
Figure 9:
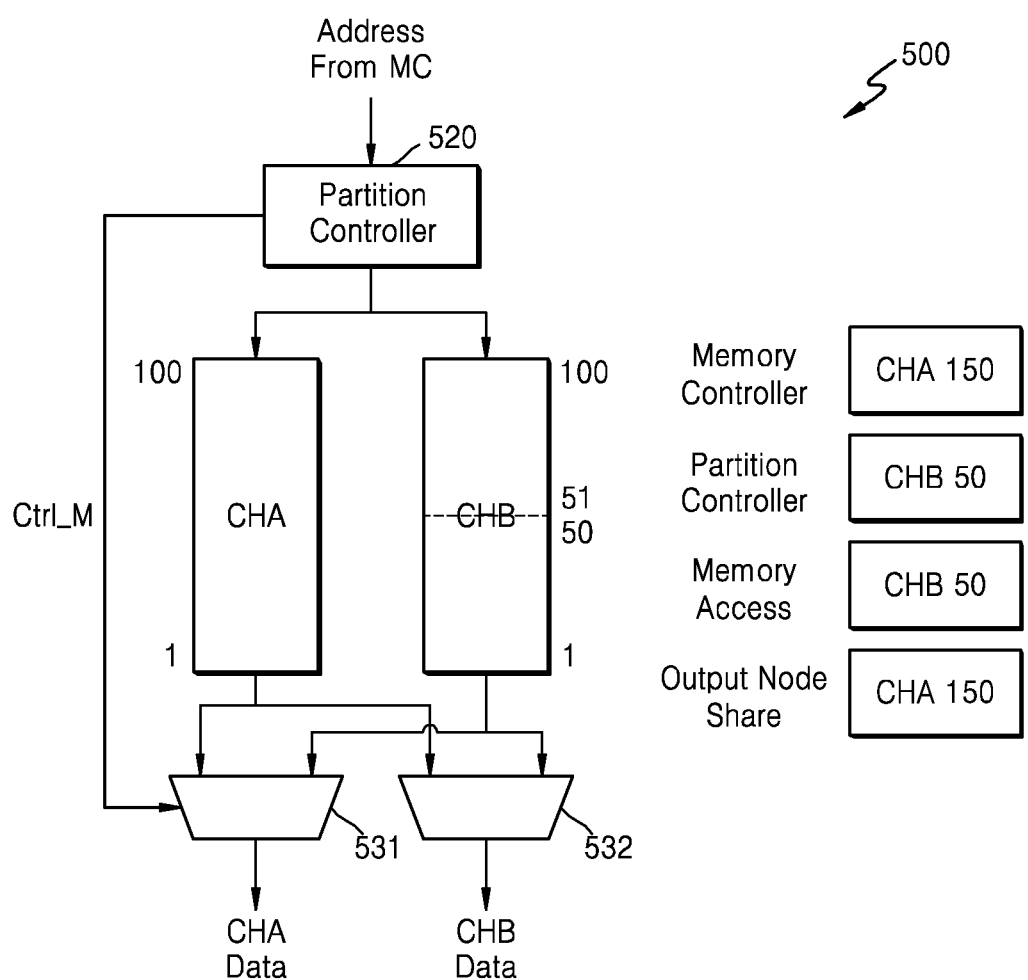

FIGS. 8 and 9 are block diagrams of a partition controller and an operation thereof according to an exemplary embodiment of the inventive concept.

Referring to FIG. 8, a memory system 500 may include a memory controller 510 and a memory device, wherein the memory device may include a partition controller 520. In addition, the partition controller 520 may include a table management module 521 and an address conversion table 522. The memory controller 510 may receive a result of monitoring memory usage of a plurality of channels from an access monitor according to the above-described exemplary embodiment and may provide the assignment information Info_Assign for further assignment of a storage space to the partition controller 520 based on the monitoring result.

The table management module 521 receives the assignment information Info_Assign and may control the address conversion table 522 based thereon. For example, the table management module 521 may set conversion information for converting the address ADD provided from the memory controller 510 into the internal address ADD_I, which indicates a storage space of a plurality of channels to which actual data is to be accessed.

For example, an address range of a cell array of each of the channel A CHA and the channel B CHB may have a value of 1 to 100. A storage space indicated by 1 to 50 of the cell array of the channel B CHB may be further assigned to the channel A CHA.

When the address ADD from the memory controller 510 corresponds to addresses 101 to 150 (e.g., a first range) of the A channel CHA (CHA101~150), the address ADD may be converted into the internal address ADD_I corresponding to the addresses 1 to 50 of the cell array of the channel B CHB (CHB1~50) by the address conversion table 522.

When the address ADD from the memory controller 510 corresponds to the addresses 1 to 100 (e.g., a second range) of the channel A CHA (CHA1~100), the address ADD may be converted into the internal address ADD_I indicating the cell array of the channel A CHA (CHA1~100) by the address conversion table 522.

When the address ADD corresponds to the addresses 1 to 50 of the channel B CHB (CHB1~50), the address ADD may be converted into the internal address ADD_I corresponding to the addresses 51 to 100 of the cell array of the channel B CHB (CHB51~100) by the address conversion table 522.

FIG. 9 is a block diagram illustrating an example of a data access operation in a case where a storage space of a portion of the channel B CHB is further assigned to the channel A CHA.

Referring to FIGS. 8 and 9, the memory system 500 may include the plurality of channels, the partition controller 520, and a plurality of selectors. For example, FIG. 9 shows the channel A CHA and the channel B CHB and further shows first and second selectors 531 and 532 corresponding to the channel A CHA and the channel B CHB, respectively. The channel A CHA and the channel B CHB share an output node for interfacing with the outside. For example, data of the channel A CHA may be output through a path corresponding to the channel A CHA or the channel B CHB, and data of the channel B CHB may also be output through the path corresponding to the channel A CHA or the channel B CHB. The first selector 531 may be included in the channel A CHA and the second selector 532 may be included in the channel B CHB.

The partition controller 520 may receive an address from a memory controller (e.g., MC) and perform a conversion operation on the address according to the exemplary embodiments described above. For example, if a storage space corresponding to addresses 1 to 50 of the channel B CHB is further assigned to the channel A CHA, the memory controller may determine an address range of the channel A CHA as 1 to 150 and an address range of the channel B CHB as 1 to 50. Further, an address having a value of 101 to 150 of the channel A CHA from the memory controller may be converted into an internal address for indicating a storage space in the channel B CHB in the memory device.

Each of the first and second selectors 531 and 532 may provide data to the memory controller through an independent path. In an example, the first selector 531 may transmit data through a path corresponding to the channel A CHA of the memory device and the second selector 532 may transmit data through a path corresponding to the channel B CHB. Each of the first and second selectors 531 and 532 may be controlled in response to a selection control signal Ctrl_M provided from the partition controller 520. For example, an access request to a storage space corresponding to an address range 51 to 100 of the channel B CHB may be received through the path corresponding to the channel B CHB, and accessed data may be output through the second selector 532. On the other hand, an access request to a storage space corresponding to the address range 1 to 50 of the channel B CHB may be received through the path corresponding to the channel A CHA, and accessed data may be output through the first selector 531.

Meanwhile, referring to the operation example shown in FIG. 9, when the memory controller requests data access to a location of the address 150 of the channel A CHA, the partition controller 520 of the memory device may convert the received address to the address 50 of the channel B CHB, and data of a memory located at the converted address 50 of the channel B CHB may be accessed. Furthermore, the data of the address 150 of the channel A CHA requested by the memory controller may be provided to an output of the first selector 531 from the channel B CHB through an output node sharing structure of the channel A CHA and the channel B CHB.

According to the above-described exemplary embodiment, channels providing a storage space to be further assigned may be selected according to various methods. For example, when an output node of a different channel (e.g., the channel B CHB) is shared by the channel A CHA, a storage space of the channel B CHB may be selected and further assigned to the channel A CHA. Alternatively, when an output node of the channel A CHA is shared by a plurality of channels, a storage space of one or more channels that are selected from among the plurality of channels may be further assigned to the channel A CHA. For example, a storage space of a channel with the least memory usage among the plurality of channels may be further assigned to the channel A CHA.

Figure 10:
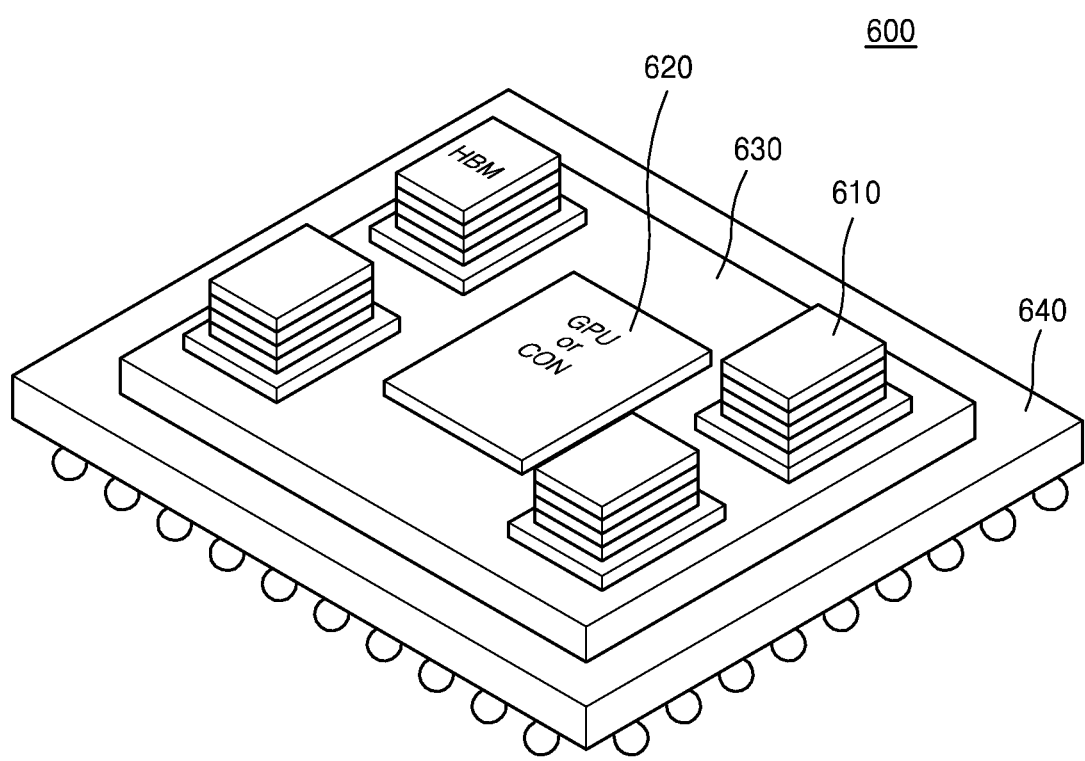
FIGS. 10 and 11 are views illustrating an example in which a memory device according to an exemplary embodiment of the inventive concept is applied to a high bandwidth memory (HBM).
Figure 11:
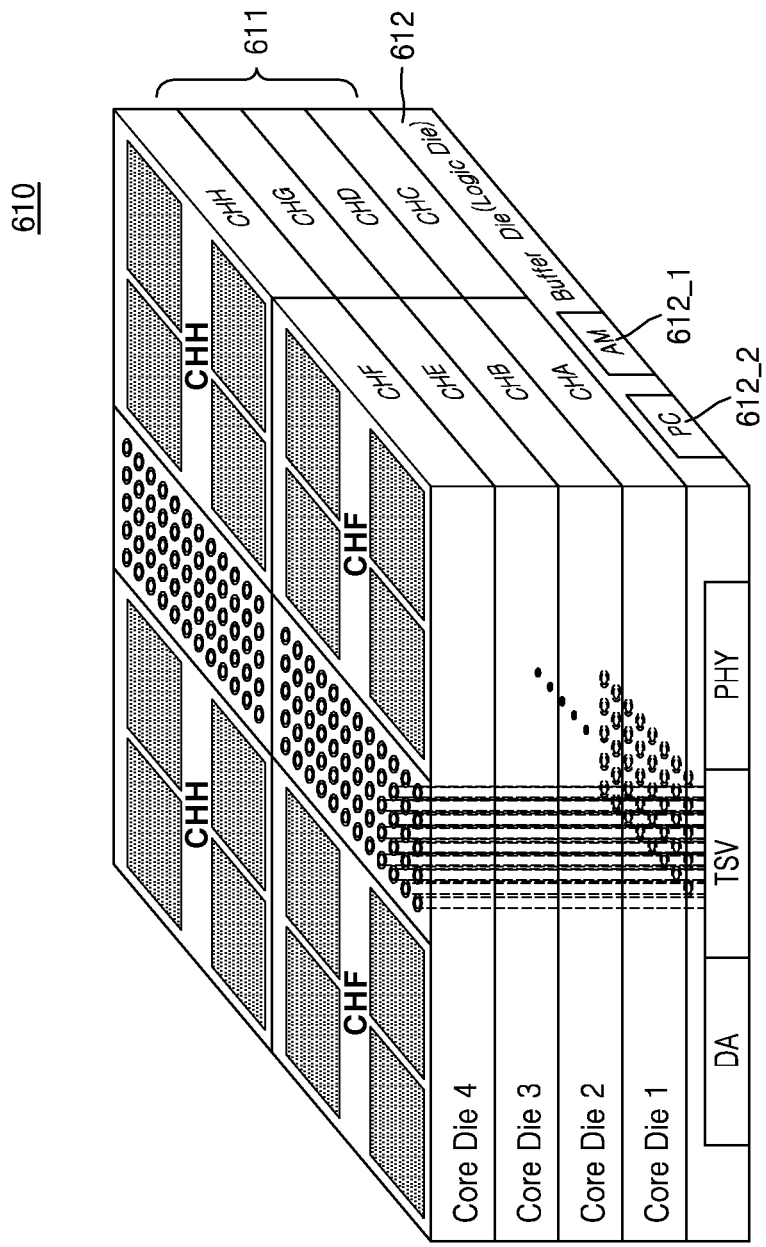

FIGS. 10 and 11 are views illustrating an example in which a memory device according to an exemplary embodiment of the inventive concept is applied to a high bandwidth memory (HBM).

Referring to FIG. 10, the memory device or the memory system described above may include an HBM 610, and the memory system shown in FIG. 10 may be referred to as an HBM module 600 including a plurality of HBMs 610. The HBM module 600 may include a package substrate 640, an interposer 630, the plurality of HBMs 610, and at least one controller 620 mounted on the interposer 630. For example, the memory controller according to the above-described exemplary embodiments may correspond to the controller 620 shown in FIG. 10. Alternatively, various types of controllers including a memory control function may correspond to the controller 620 shown in FIG. 10; for example, a hardware accelerator such as a graphics processing unit (GPU) may correspond to the controller 620. Here, the hardware accelerator may include the functions of the memory controller described above. In addition, various kinds of hardware accelerators such as a field-programmable gate array (FPGA), a massively parallel processor array (MPPA), an application-specific integrated circuit (ASIC), a neural processing unit (NPU), a tensor processing unit (TPU), or multi-processor system-on-chip (MPSoC) may be applied to the controller 620 shown in FIG. 10.

The plurality of HBMs 610 and the controller 620 may communicate signals with each other through wirings formed in the interposer 630. The interposer 630 may include a wiring, such as an embedded multi-die interconnect bridge (EMIB) of an organic or non-through-silicon via (TSV) method with a silicon TSV or a printed circuit board (PCB) type. According to an exemplary embodiment of the inventive concept, the HBM module 600 may include only the plurality of HBMs 610 without the controller 620.

Each of the plurality of HBMs 610 shown in FIG. 10 may perform a memory operation according to the above-described exemplary embodiments. As an example, each of the HBMs 610 may include the plurality of channels, and each of the plurality of channels may communicate with the controller 620 through an independent interface. In addition, each of the HBMs 610 may include a device for monitoring memory usage of the plurality of channels, and may also include a partition controller for assigning a storage space to each of the plurality of channels. Through communication between the controller 620 and the HBMs 610, the HBMs 610 may monitor the memory usage of the channels by determining an address from the controller 620, and the partition controller in the HBMs 610 may manage an address conversion table based on control by the controller 620.

According to an exemplary embodiment of the inventive concept, each of the HBMs 610 may include a buffer die (or logic die) that includes a peripheral circuit for controlling a memory operation and one or more core dies that include a memory cell array and are stacked on the buffer die. In each of the HBMs 610, the access monitor and the partition controller may be arranged in the buffer die. However, the inventive concept is not limited thereto. For example the access monitor and the partition controller may be variously located in the HBM module 600.

FIG. 11 shows an example of the HBM 610 of FIG. 10. Referring to FIGS. 10 and 11, the HBM 610 may have an increased bandwidth by including a plurality of channels having independent interfaces. As an example, the HBM 610 may include a plurality of dies, and may include, for example, a buffer die (or a logic die) 612 and one or more core dies 611 stacked on the buffer die 612. In FIG. 11, first to fourth core dies are provided in the HBM 610, but the number of core dies 611 may vary.

Furthermore, each of the core dies 611 may include one or more channels. In an example of FIG. 11, each of the core dies 611 includes two channels, so that the HBM 610 includes eight channels CHA to CHH. For example, the first core die may include the channel A CHA and the channel C CHC, the second core die may include the channel B CHB and the channel D CHD, the third core die may include the channel E CHE and the channel G CHG, and the fourth core die may include the channel F CHF and the channel H CHH.

The buffer die 612 may communicate with the controller (or the hardware accelerator) 620, may receive commands, addresses, and data from the controller 620, and may provide the received commands, addresses, and data to the core dies 611. The buffer die 612 may communicate with the controller 620 through a conductive unit such as a bump formed on the outer surface thereof. The buffer die 612 may buffer the commands, addresses, and data so that the controller 620 may interface with the core dies 611 by driving only a load of the buffer die 612.

Furthermore, the HBM 610 may include a plurality of through silicon vias (TSVs) through dies. The TSVs may be arranged corresponding to the channels CHA to CHH, and if each channel has a bandwidth of 128 bits, the TSVs may include configurations for 1024 bits of data input/output.

According to an exemplary embodiment of the inventive concept, an access monitor (AM) 612_1 and a partition controller (PC) 612_2 may be arranged in the buffer die 612. As described above, the AM 612_1 may monitor memory usage of the channels CHA to CHH, and the PC 612_2 may manage an address conversion table to assign a storage space to each channel.

The buffer die 612 may include a TSV region TSV, a physical region PHY, and a direct access region DA. The TSV region TSV is a region where a TSV for communication with the core dies 611 is formed. The physical region PHY may include a plurality of input and output circuits for communication with the controller 620 and the direct access region DA may directly communicate with an external tester through a conductive unit that is arranged on an outer surface of the HBM 610 in a test mode for the HBM 610. Various signals provided from the external tester may be provided to the core dies 611 through the direct access region DA and the TSV region TSV.

The HBM module 600 may be used for processing of data for various purposes, and the HBM module 600 may be used for a neural network operation according to an exemplary embodiment of the inventive concept. As an example, the HBM module 600 may perform neural network operations according to various types of models such as convolutional neural networks (CNN), recurrent neural networks (RNN), multi-layer perceptron (MLP), deep belief networks, or restricted Boltzman machines.

A hardware accelerator such as a GPU included in the HBM module 600 may perform a neural network operation using data and weights, and the HBM 610 may store the data and weights based on control of the hardware accelerator. For example, the HBM 610 includes the plurality of channels, and one of the channels of the HBM 610 (e.g., an assigned channel) may store training data according to the neural network operation. Additionally, at least one other channel of the HBM 610 may be used for other purposes such as an intermediate operation result during the neural network operation, and data may be accessed from the at least one other channel of the HBM 610 through channel interleaving.

The neural network operation may require a lot of storage space and high bandwidth. When any one channel (e.g., the channel A CHA) is assigned to the neural network operation, memory usage of the assigned channel A CHA may be monitored periodically or in real time. When a storage space needs to be further assigned to the channel A CHA according to a result of the monitoring, a storage space of at least one of the other channels of the HBM 610 may be further assigned to the channel A CHA according to the exemplary embodiments described above.

According to exemplary embodiments of the inventive concept as described above, a memory capacity of the channel A CHA assigned to the neural network operation may be dynamically adjusted, thus reducing or preventing the degradation of neural network performance due to loss of training data. In addition, since bandwidths of the other channels used for the neural network operation are not reduced, the degradation of operation performance may be reduced or prevented.

Figure 12:
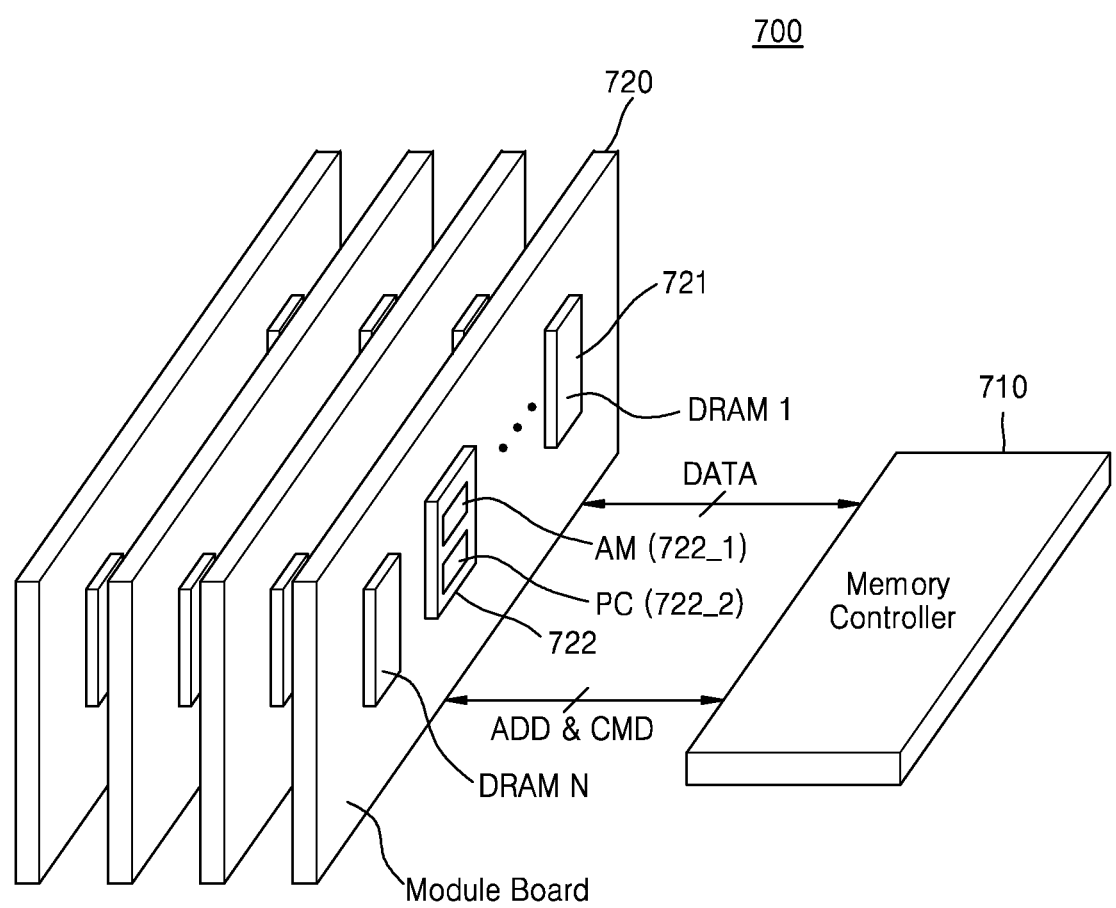
FIG. 12 is a view of a memory system including a memory module to which an exemplary embodiment of the inventive concept is applied.

FIG. 12 is a view of a memory system including a memory module to which an exemplary embodiment of the inventive concept is applied.

Referring to FIG. 12, a memory system 700 may include a memory controller 710 and one or more memory modules 720. One of the memory modules 720 includes a module board on which one or more memory chips 721 as a memory device and a buffer chip 722 are mounted. In addition, the memory module 720 may be implemented in various forms such as a single in-line memory module (SIMM) or a dual in-line memory module (DIMM).

The above-described channels may be variously defined in the memory system 700. According to an exemplary embodiment of the inventive concept, the memory module 720 may include one channel as described above, or the memory chips 721 mounted on the memory module 720 may constitute one channel. Alternatively, each of the memory chips 721 may include a plurality of cell regions, and each cell region may constitute one channel. In the exemplary embodiment shown in FIG. 12, it is assumed that each of the plurality of memory chips 721 included in one memory module constitutes one channel.

Referring to the one memory module 720, the memory module 720 may include a plurality of channels and the buffer chip 722 may manage data accesses of the memory chips 721 of the memory module 720. For example, the buffer chip 722 may communicate with the memory controller 710, may receive a command CMD and the address ADD from the memory controller 710, and may also communicate data DATA with the memory controller 710.

The buffer chip 722 may include an access monitor 722_1 and a partition controller 722_2 according to the above-described exemplary embodiment. The access monitor 722_1 may monitor memory usage of the memory chips 721 provided in the memory module 720 and a result of the monitoring may be provided to the memory controller 710. In addition, the partition controller 722_2 may perform an operation of assigning a storage space to a channel based on control of the memory controller 710, and as an example, may further assign a storage space of a portion of one or more channels according to the exemplary embodiments described above.

For example, when a first DRAM chip DRAM 1 corresponding to a first channel is assigned and data access is being performed, as memory usage of the first DRAM chip DRAM 1 exceeds a predetermined threshold value, a storage space of a portion of an $N^{th}$ DRAM chip DRAM N corresponding to an $N^{th}$ channel may be further assigned to the first channel through the assignment operation according to the exemplary embodiments described above. The memory module 720 may communicate with the memory controller 710 through N paths corresponding to the plurality of (e.g., N) channels. Data DATA accessed from the storage space of a portion of the $N^{th}$ DRAM chip DRAM N may be provided to the memory controller 710 through a first path corresponding to the first channel.

Figure 13A:
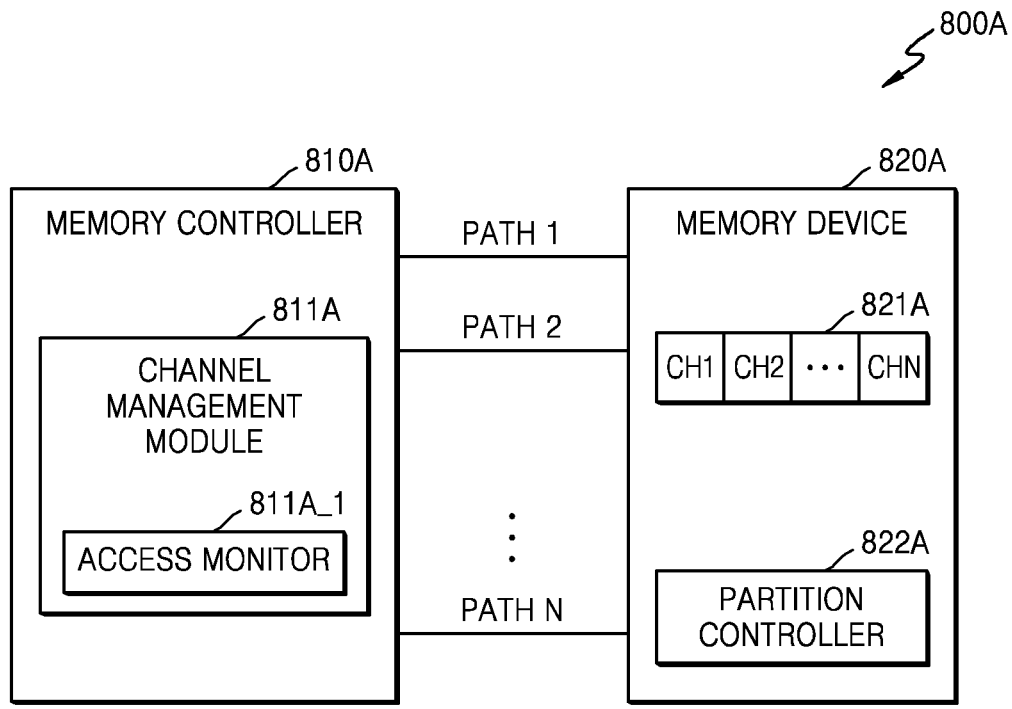
FIGS. 13A to 13C are block diagrams of a memory system according to exemplary embodiments of the inventive concept.
Figure 13B:
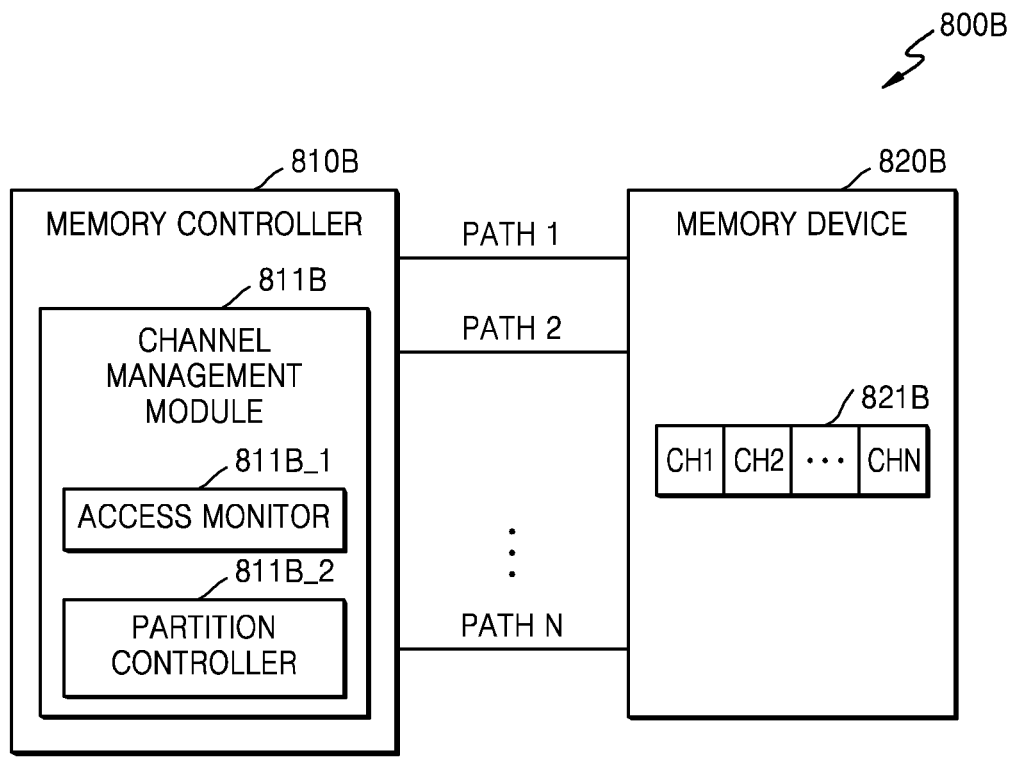
Figure 13C:
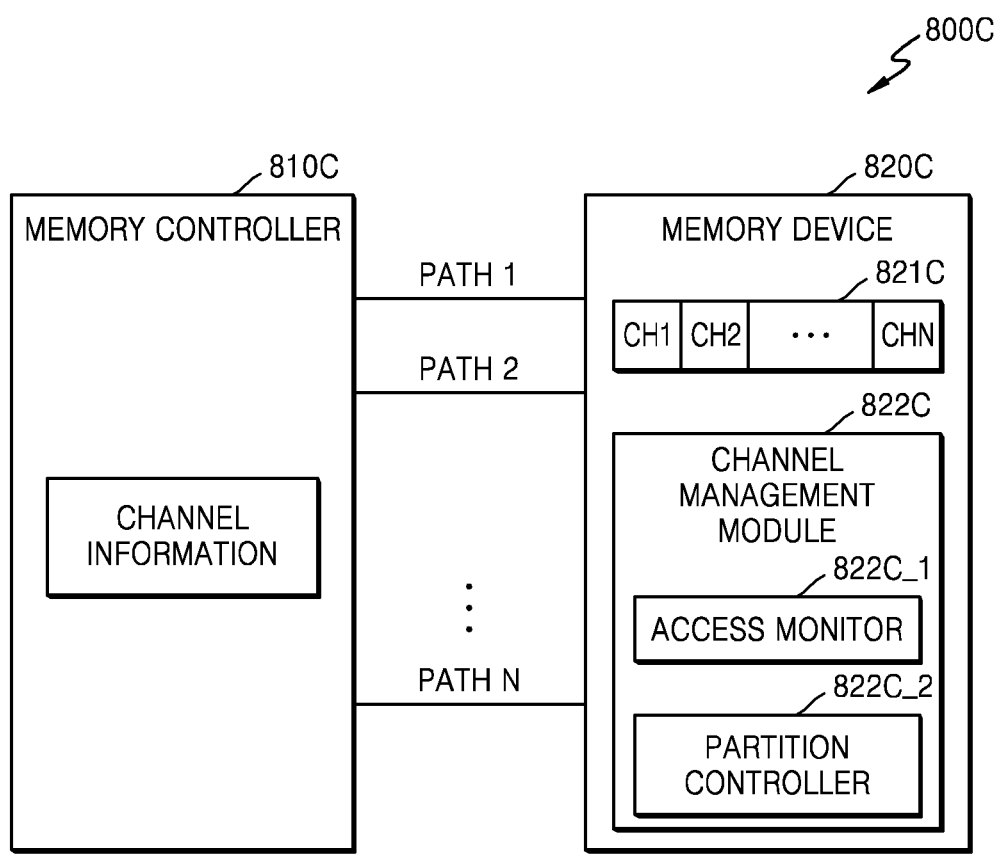

FIGS. 13A to 13C are block diagrams of a memory system according to exemplary embodiments of the inventive concept. FIGS. 13A to 13C illustrate various locations in which the functions of the present application described above are performed.

Referring to FIG. 13A, a memory system 800A may include a memory controller 810A and a memory device 820A, wherein the memory controller 810A may include a channel management module 811A, and the memory device 820A may include a plurality of channels 821A. Furthermore, an access monitor 811A_1 according the above-described exemplary embodiment may be included in the memory controller 810A and a partition controller 822A may be included in the memory device 820A.

The memory controller 810A may monitor memory usage of the plurality of channels 821A based on an address provided to the memory device 820A. Additionally, according to a result of the monitoring, assignment information for assigning a storage space to the channel may be provided to the memory device 820A. In addition, the memory device 820A may perform a data access operation according to an address conversion table set based on the assignment information.

Referring to FIG. 13B, a memory system 800B may include a memory controller 810B and a memory device 820B, wherein the memory controller 810B may include a channel management module 811B, and the memory device 820B may include a plurality of channels 821B. In addition, an access monitor 811B_1 and a partition controller 811B_2 according to the above-described exemplary embodiment may be included in the memory controller 810B.

The access monitor 811B_1 may monitor memory usage of the plurality of channels 821B based on an address to be provided to the memory device 820B and the partition controller 811B_2 may assign a storage space for the channels 821B of the memory device 820B by managing an internal address conversion table. According to an exemplary embodiment of the inventive concept, a selection control signal for selecting a path to which data output from the memory device 820B is to be transmitted may be generated in memory controller 810B and provided to the memory device 820B, or may be generated in the memory device 820B based on information from the memory device 820B.

Referring to FIG. 13C, a memory system 800C may include a memory controller 810C and a memory device 820C, and the memory device 820C may include a plurality of channels 821C and a channel management module 822C. In addition, an access monitor 822C_1 and a partition controller 822C_2 according to the above-described exemplary embodiment may be included in the channel management module 822C.

The memory device 820C may determine to further assign a storage space to a channel by itself according to the above-described exemplary embodiments, thus managing the storage space of the channel. Here, the memory device 820C may provide the memory controller 810C with channel information having storage space assignment information (or memory capacity information) for the plurality of channels 821C.

Figure 14:
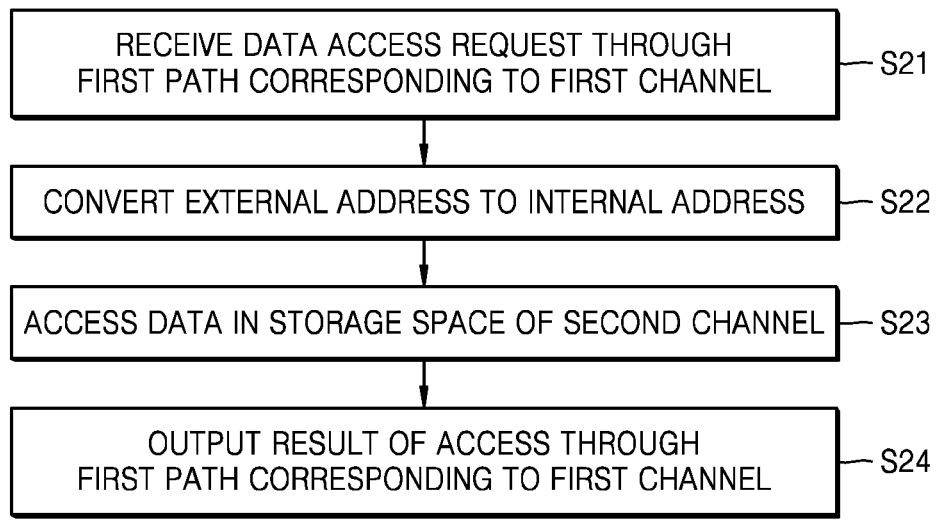
FIG. 14 is a flowchart of a method of operating a memory device, according to an exemplary embodiment of the inventive concept.

FIG. 14 is a flowchart of a method of operating a memory device, according to an exemplary embodiment of the inventive concept.

Referring to FIG. 14, the memory device may adjust a memory capacity of channels according to the above-described exemplary embodiments, and as an example, a storage space of a portion of a second channel may be further assigned to a first channel. Accordingly, a memory capacity of the first channel may be larger than that of the second channel.

In operation S21, the memory device may receive a data access request from a memory controller through a first path corresponding to the first channel. Further, in operation S22, the memory device may convert an address (e.g., an external address) provided from the memory controller to an internal address through an address conversion table. In operation S23, the internal address may indicate a storage space of a cell array physically located in the second channel, so that the memory device may access data in the storage space of the second channel.

In operation S24, the memory device may output a result of the access to the memory controller through the first path corresponding to the first channel. According to the above-described exemplary embodiment, the first channel and the second channel may have a structure sharing the output, so that the data accessed from the cell array of the second channel may be output through the first path corresponding to the first channel.

Figure 15:
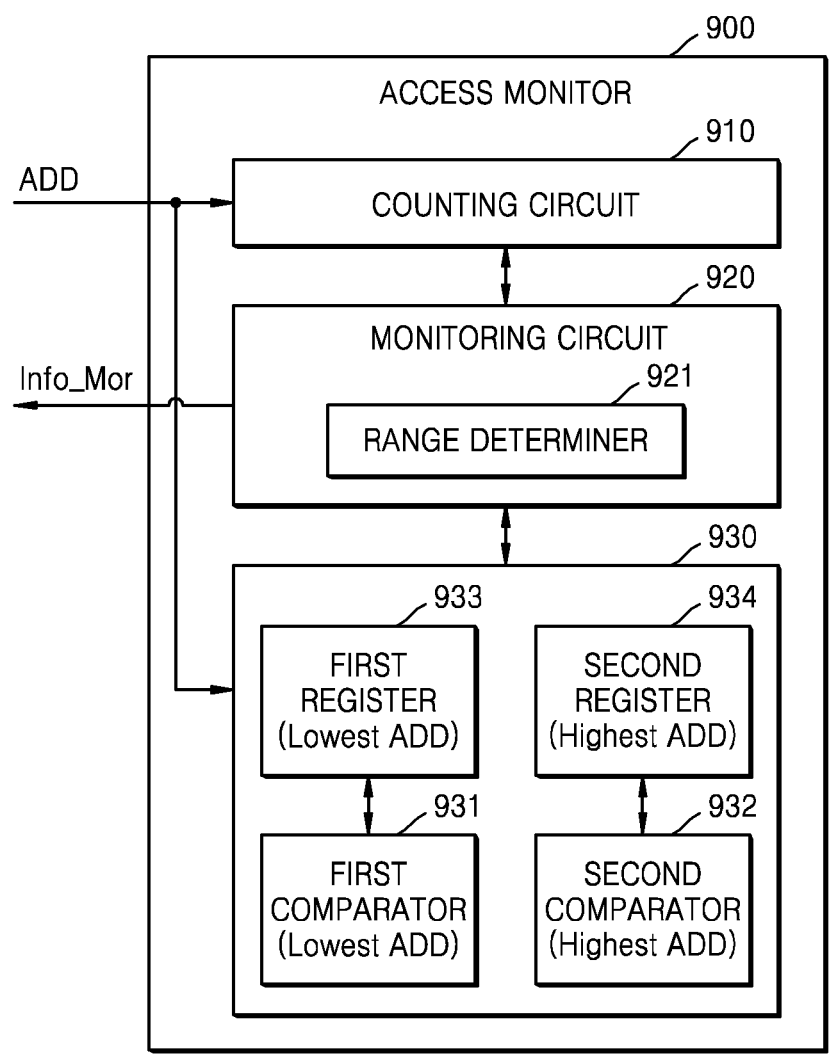
FIG. 15 is a block diagram of a memory system according to an exemplary embodiment of the inventive concept.

FIG. 15 is a block diagram of a memory system according to an exemplary embodiment of the inventive concept. FIG. 15 shows an example in which a storage space is further assigned with reference to an accessed address range.

Referring to FIG. 15, the memory device may include an access monitor 900, and the access monitor 900 may include a counting circuit 910, a monitoring circuit 920, and an address range storage circuit 930. Since operation examples of the counting circuit 910 and the monitoring circuit 920 are the same as or similar to those in the above-described exemplary embodiments, a detailed description thereof will not be given herein.

The address range storage circuit 930 may store information about the accessed address range of a cell array per channel. For example, information on a lowest address (Lowest ADD) accessed in a cell array of the first channel may be stored in a first register 933, and information on a highest address (Highest ADD) may be stored in a second register 934. A first comparator 931 may also compare the address ADD received from the memory controller with the Lowest ADD and may update the address ADD to the first register 933 when a lower address is received. Similarly, a second comparator 932 may compare the address ADD received from the memory controller with the Highest ADD and may update the address ADD to the second register 934 when a higher address is received.

The monitoring circuit 920 may include a range determiner 921 and the monitoring information Info_Mor may include a result of monitoring the number of accesses and a result of monitoring an address range. For example, when an accessed address range of the cell array of the first channel does not exceed a predetermined reference value even when the number of accesses of the first channel exceeds a threshold value according to a result of counting the counting circuit 910, no additional storage space may be assigned to the first channel.

Figure 16:
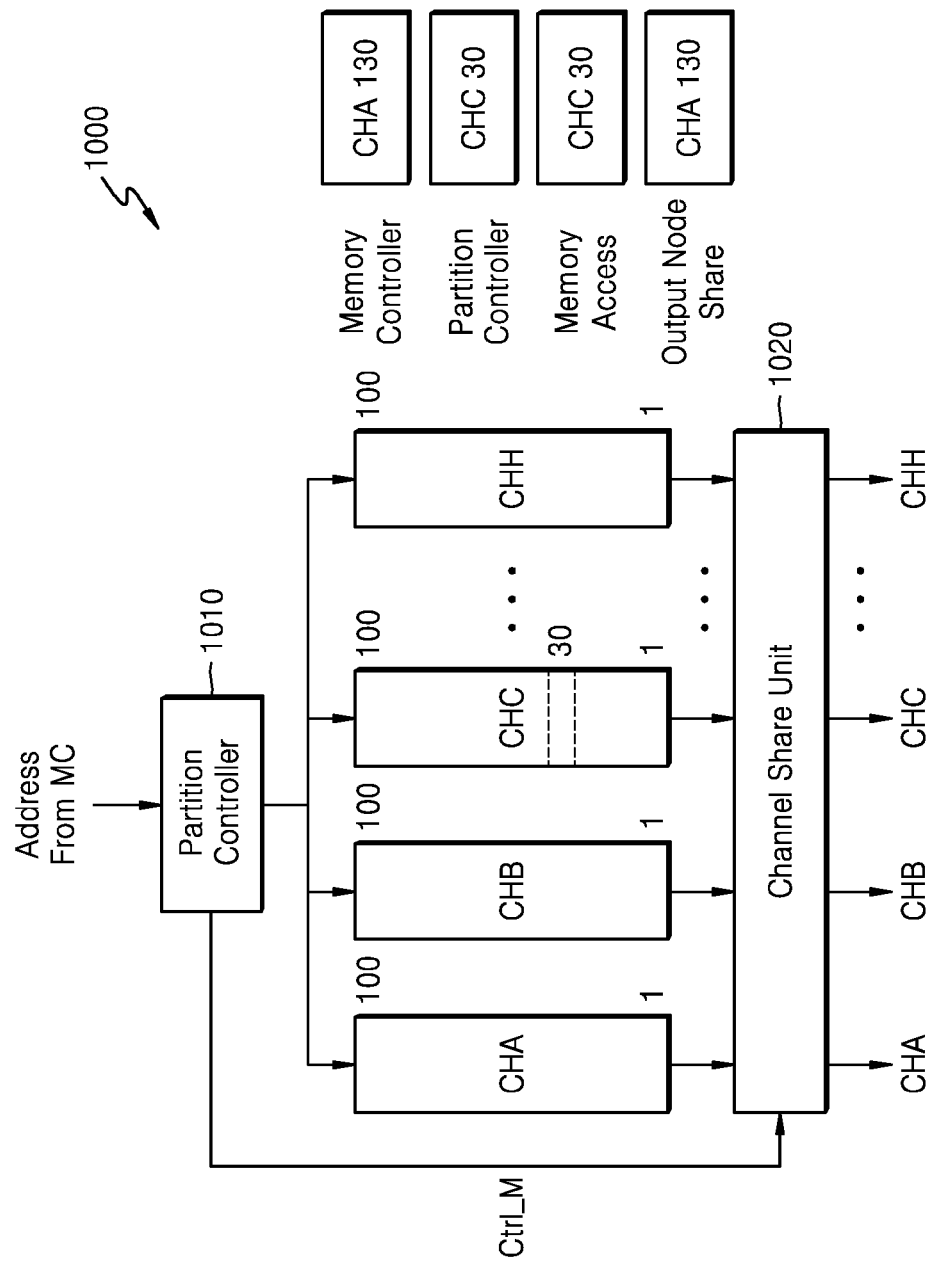
FIG. 16 is a block diagram of a memory device according to an exemplary embodiment of the inventive concept.

FIG. 16 is a block diagram of a memory device according to an exemplary embodiment of the inventive concept.

A memory device 1000 may include a partition controller 1010, the plurality of channels CHA to CHH, and a channel sharing unit 1020. The channel sharing unit 1020 may include a circuit for sharing output nodes of the plurality of channels CHA to CHH. As an example, the channel sharing unit 1020 may include a multiplexer for outputting data of the plurality of channels CHA to CHH to a plurality of paths corresponding thereto. Furthermore, additional assignment of a storage space may be performed according to the exemplary embodiments described above. For example, a storage space of the remaining channels CHB to CHH may be further assigned to the channel A CHA. In the example of FIG. 16, it is assumed that a storage space of the address 30 of the channel C CHC is further assigned to the channel A CHA.

When an access request for the address 130 of the channel A CHA is received from the memory controller, data at the address 30 of the channel C CHC may be accessed through an address conversion operation in the memory device. The data of the channel C CHC may be provided to the channel sharing unit 1020 and the channel sharing unit 1020 may output the data from the channel C CHC through a path corresponding to the channel A CHA. As an example, the channel sharing unit 1020 may control an output of data in response to the selection control signal Ctrl_M from the partition controller 1010.

As described above, a memory device and a memory system including the same according to exemplary embodiments of the inventive concept may monitor memory usage of a plurality of channels and dynamically adjust a memory capacity of the channels based on the memory usage, so that storage space of the memory device may be efficiently used.

While the inventive concept has been particularly shown and described with reference to exemplary embodiments thereof, it will be understood that various changes in form and details may be made thereto without departing from the spirit and scope of the inventive concept as set forth by the following claims.

What is claimed is:

1. A memory device comprising:
a first channel comprising a first cell array and configured to communicate with a memory controller through a first path;
a second channel comprising a second cell array and configured to communicate with the memory controller through a second path; and
an assignment control circuit configured to monitor memory usage of the first and second channels, and increase a memory capacity of the first channel by assigning a storage space of a portion of the second cell array to the first channel when the memory usage of the first cell array exceeds a threshold value,
wherein the storage space of the portion of the second cell array assigned to the first channel is recognized as a storage space included in the first channel by the memory controller,
wherein access to the storage space of the portion of the second cell array assigned to the first channel is performed through the first path,
wherein the assignment control circuit comprises:
a partition controller configured to receive assignment information indicating a storage space to be further assigned to the first channel from the memory controller, and to assign the storage space of the portion of the second channel to the first channel by managing an internal address of the memory device according to the received assignment information.

2. The memory device of claim 1, further comprising:
a first selector configured to output data through the first path and a second selector configured to output data through the second path,
wherein the first selector is configured to output data read from the storage space of the portion of the second cell array assigned to the first channel to the first path.

3. The memory device of claim 2, wherein the second selector is configured to output, to the second path, data read from a storage space of the second cell array not assigned to the first channel.

4. The memory device of claim 1, wherein the assignment control circuit further comprises:
an access monitor configured to provide a result of monitoring memory usage of each of the first channel and the second channel to the memory controller.

5. The memory device of claim 4, wherein the access monitor comprises:
a counter block comprising counters for increasing a counting value each time the first channel and the second channel are accessed; and
an access rate storage circuit configured to store information related to a relative access frequency of the first and second channels based on the counting value and to provide the stored information as the result of monitoring the memory usage of the first and second channels.

6. The memory device of claim 5, wherein the access rate storage circuit comprises:
a first register corresponding to the first channel and a second register corresponding to the second channel,
wherein, as a number of accesses to the first channel increases, a value stored in the first register increases and a value stored in the second register decreases, and
the storage space of the portion of the second cell array is further assigned to the first channel when the value stored in the first register is greater than or equal to a predetermined reference value.

7. The memory device of claim 1, wherein the partition controller comprises:
an address conversion table configured to convert an address provided from the memory controller to the internal address of the memory device,
wherein the address conversion table is configured to output a first internal address for indicating the first cell array when the address provided from the memory controller through the first path is included in a first range, and to output a second internal address for indicating the second cell array when the address is included in a second range.

8. The memory device of claim 7, wherein the partition controller further comprises:
a table management module configured to set conversion information in the address conversion table according to the assignment information received from the memory controller.

9. The memory device of claim 1, wherein the memory device further comprises third to $N^{th}$ channels (where N is an integer of 3 or more) each comprising a cell array, and
the assignment control circuit is configured to further monitor memory usage of the third to $N^{th}$ channels and to further assign a storage space of a portion of a cell array of a channel with the least memory usage, among the second to the $N^{th}$ channels, to the first channel.

10. The memory device of claim 1, wherein the memory device comprises a high bandwidth memory (HBM), and the HBM comprises a buffer die and one or more core dies, and the assignment control circuit is arranged in the buffer die.

11. A memory device comprising:
a first channel comprising a first cell array and configured to communicate with a memory controller through a first path;

a second channel comprising a second cell array and configured to communicate with the memory controller through a second path; and an assignment control circuit configured to monitor memory usage of the first and second channels and further assign a storage space of a portion of the second cell array to the first channel when the memory usage of the first cell array exceeds a threshold value, wherein access to the storage space of the portion of the second cell array assigned to the first channel is performed through the first path, wherein the assignment control circuit comprises:
- an access monitor configured to provide a result of monitoring memory usage of each of the first channel and the second channel to the memory controller; and
- a partition controller configured to receive assignment information indicating a storage space to be further assigned to the first channel from the memory controller, and to assign the storage space of the portion of the second channel to the first channel by managing an internal address of the memory device according to the received assignment information.

12. The memory device of claim 11, wherein the partition controller comprises:
- an address conversion table configured to convert an address provided from the memory controller to the internal address of the memory device,
- wherein the address conversion table is configured to output a first internal address for indicating the first cell array when the address provided from the memory controller through the first path is included in a first range, and to output a second internal address for indicating the second cell array when the address is included in a second range.

13. The memory device of claim 12, wherein the partition controller further comprises:
- a table management module configured to set conversion information in the address conversion table according to the assignment information received from the memory controller.

* * * * *